(12) United States Patent
Choe et al.

(10) Patent No.: US 9,998,433 B2
(45) Date of Patent: Jun. 12, 2018

(54) METHOD AND APPARATUS FOR MANAGING DATA, AND DATA MANAGEMENT SYSTEM USING THE SAME

(71) Applicant: SAMSUNG SDS CO., LTD., Seoul (KR)

(72) Inventors: Min Hyeok Choe, Seoul (KR); In Seon Yoo, Seoul (KR); Yeong Seok Park, Seoul (KR); Jae Wook Chung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days. days.

(21) Appl. No.: 15/098,646

(22) Filed: Apr. 14, 2016

(65) Prior Publication Data

US 2016/0308842 A1    Oct. 20, 2016

(30) Foreign Application Priority Data

Apr. 14, 2015    (KR) .................. 10-2015-0052402

(51) Int. Cl.
*H04L 29/06* (2006.01)
(52) U.S. Cl.
CPC ...... *H04L 63/0428* (2013.01); *H04L 63/0471* (2013.01)
(58) Field of Classification Search
CPC .................. H04L 63/0471; H04L 63/0428
See application file for complete search history.

(56) References Cited

U.S. PATENT DOCUMENTS

| 8,069,470 B1* | 11/2011 | Montenegro ......... H04L 63/126 726/3 |
| 9,078,015 B2* | 7/2015 | Kar ................... H04N 21/23476 |
| 9,646,166 B2* | 5/2017 | Cash .................... G06F 21/602 |

(Continued)

FOREIGN PATENT DOCUMENTS

| JP | 2011211593 A | 10/2011 |
| KR | 1020140071605 A | 6/2014 |
| KR | 101438274 B1 | 9/2014 |

OTHER PUBLICATIONS

Communication dated Jun. 7, 2016, issued by the Korean Intellectual Property Office in counterpart Korean Application No. 10-2015-0052402.

*Primary Examiner* — Nelson Giddins
(74) *Attorney, Agent, or Firm* — Sughrue Mion, PLLC

(57) ABSTRACT

A method for managing data, comprising: receiving data about information collected by a sensor, in which at least a part of the data is encrypted; and performing an analysis in a state where both non-encrypted section and encrypted section of the data are not decrypted.

Also, a method for managing data encryption, comprising: allowing a sensor or an intermediate network device to encrypt at least a part of data about collected information; allowing the sensor or the intermediate network device to transmit the at least partially encrypted data; allowing a data management apparatus to receive the at least partially encrypted transmitted data; allowing the data management apparatus to store the at least partially encrypted received data; and allowing the data management apparatus to perform an analysis in a state where both non-encrypted section and encrypted section of the at least partially encrypted data are not decrypted.

12 Claims, 8 Drawing Sheets

(56) References Cited

U.S. PATENT DOCUMENTS

| | | | | |
|---|---|---|---|---|
| 2004/0236701 | A1* | 11/2004 | Beenau | G06F 17/30725 705/64 |
| 2005/0169473 | A1* | 8/2005 | Candelore | A01K 11/008 380/239 |
| 2007/0002140 | A1* | 1/2007 | Benson | G05B 13/0275 348/143 |
| 2007/0177771 | A1* | 8/2007 | Tanaka | A61B 5/117 382/115 |
| 2008/0247539 | A1* | 10/2008 | Huang | H04L 63/0428 380/28 |
| 2009/0141898 | A1* | 6/2009 | Huang | H04L 9/0833 380/270 |
| 2010/0211800 | A1* | 8/2010 | La Rocca | G06F 21/6227 713/189 |
| 2011/0103583 | A1* | 5/2011 | Yoon | H04L 9/302 380/255 |
| 2011/0141967 | A1* | 6/2011 | Lane | H04Q 9/00 370/328 |
| 2011/0211593 | A1* | 9/2011 | Pepper | H04L 43/028 370/474 |
| 2011/0224912 | A1* | 9/2011 | Bhavaraju | G06F 19/3456 702/19 |
| 2011/0264920 | A1* | 10/2011 | Rieffel | H04L 9/008 713/189 |
| 2012/0260108 | A1* | 10/2012 | Lee | G06F 21/6218 713/191 |
| 2013/0152121 | A1* | 6/2013 | Bartel-Kurz | H04H 60/15 725/31 |
| 2013/0173778 | A1* | 7/2013 | Hsy | H04L 43/14 709/224 |
| 2013/0173905 | A1* | 7/2013 | Inatomi | H04L 9/0662 713/150 |
| 2013/0328697 | A1* | 12/2013 | Lundy | G08C 17/02 340/870.16 |
| 2014/0049653 | A1* | 2/2014 | Leonard | G06T 1/0042 348/207.1 |
| 2014/0153724 | A1* | 6/2014 | Kim | H04L 63/0428 380/270 |
| 2014/0304519 | A1* | 10/2014 | Gorecki | H04L 63/045 713/176 |
| 2014/0368601 | A1* | 12/2014 | deCharms | H04W 4/021 348/14.02 |
| 2014/0379817 | A1* | 12/2014 | Logue | G06Q 10/107 709/206 |
| 2015/0025849 | A1* | 1/2015 | Quinlan | G06F 19/3418 702/188 |
| 2015/0035959 | A1* | 2/2015 | Amble | A61B 8/565 348/74 |
| 2015/0089243 | A1* | 3/2015 | Veugen | G06F 21/72 713/190 |
| 2015/0104012 | A1* | 4/2015 | Holman | H04N 1/4486 380/243 |
| 2015/0104013 | A1* | 4/2015 | Holman | G06F 21/602 380/243 |
| 2015/0134541 | A1* | 5/2015 | Woolf | G06Q 20/206 705/72 |
| 2015/0163053 | A1* | 6/2015 | Izu | H04L 9/14 713/168 |
| 2015/0164411 | A1* | 6/2015 | Selvaraj | A61B 5/1121 600/301 |
| 2016/0098698 | A1* | 4/2016 | Gopalakrishna | G06Q 20/204 705/71 |
| 2016/0102878 | A1* | 4/2016 | Smith | F24F 11/30 700/276 |
| 2016/0275294 | A1* | 9/2016 | Irvine | G06F 21/10 |
| 2017/0104733 | A1* | 4/2017 | Thanigasalam | G06F 13/1673 |
| 2017/0104752 | A1* | 4/2017 | Sakemi | H04L 63/0861 |
| 2017/0188250 | A1* | 6/2017 | Stevens | H04W 24/08 |

* cited by examiner

DATA MANAGEMENT APPARATUS (100)

FIG. 5

MATCHING INFORMATION TABLE (50)

| ENCRYPTED DATA | MATCHING INFORMATION |
|---|---|
| AK245 | NORMAL ATMOSPHERIC PRESSURE |
| BC37A | NORMAL ATMOSPHERIC PRESSURE |
| TY274 | NORMAL ATMOSPHERIC PRESSURE |
| CK028T | LOW HUMIDITY |
| JXX2YT | LOW HUMIDITY |
| GD4KY6 | LOW HUMIDITY |

METHOD AND APPARATUS FOR MANAGING DATA, AND DATA MANAGEMENT SYSTEM USING THE SAME

This application claims priority from Korean Patent Application No. 10-2015-0052402 filed on Apr. 14, 2015 in the Korean Intellectual Property Office, the disclosure of which is incorporated herein by reference in its entirety.

BACKGROUND

1. Field of the Invention

The present invention relates to a method and an apparatus for managing data, and a data management system using the same. More particularly, the present invention relates to a method and an apparatus for managing data collected from sensors, and a data management system using the same.

2. Description of the Related Art

Recently, information analysis using big data has been actively conducted.

Further, technology development and application of internet of things, in which things are connected to each other through internet to send and receive information, has also been actively conducted.

If the technology development and application of internet of things is accomplished, a massive amount of big data will be generated and used, compared to at present.

That is, various types of information are collected and analyzed by a large number of things to be able to provide various services and derive a variety of information.

However, a variety of information collected by a large number of things, including smart phones, existing around persons, may include personal private information, and the collection, storage and usage of such personal private information may lead to anxiety about leakage of personal information and may be involved in invasion of privacy.

Therefore, security of data is important in the technologies for managing and using data.

As one of the methods of improving the security of data, there is a method of encrypting data and decrypting the data as needed.

However, it takes a lot of time and cost to encrypt and process a massive amount of data. Further, it also takes a lot of time and cost to decrypt the encrypted data in order to use this data.

SUMMARY

An aspect of the present invention provides a method and an apparatus for managing data, which can the time and cost taken to encrypt and decrypt data and can improve the security of data, and a data management system using the same.

Another aspect of the present invention provides a method and an apparatus for managing data, which can be used to analyze the encrypted data without decrypting this data, and a data management system using the same.

As described above, according to the present invention, the time and cost taken to encrypt and decrypt data can be reduced, and the security of data can be improved.

Further, according to the present invention, the encrypted data can be analyzed without being decrypted. Therefore, the time and cost taken to decrypt the encrypted data can be reduced. Moreover, since the data obtained by decrypting the encrypted data does not exist, safety can be maintained even in the leakage of data.

In some embodiments, a method for managing data, comprising: receiving data about information collected by a sensor, in which at least a part of the data is encrypted; and performing an analysis in a state where both non-encrypted section and encrypted section of the data are not decrypted.

In some embodiments, a method for managing data encryption, comprising: allowing a sensor or an intermediate network device to encrypt at least a part of data about collected information; allowing the sensor or the intermediate network device to transmit the at least partially encrypted data; allowing a data management apparatus to receive the at least partially encrypted transmitted data; allowing the data management apparatus to store the at least partially encrypted received data; and allowing the data management apparatus to perform an analysis in a state where both non-encrypted section and encrypted section of the at least partially encrypted data are not decrypted.

In some embodiments, a data management apparatus, comprising: a data receiving unit for receiving data about information collected by a sensor, in which at least a part of the data is encrypted; and an analysis performing unit for performing an analysis in a state where both non-encrypted section and encrypted section of the data are not decrypted.

In some embodiments, a data management system, comprising: an intermediate network device for encrypting at least a part of data about information collected by a sensor and transmitting the at least partially encrypted data; and a data management apparatus for receiving the at least partially encrypted transmitted data, storing the at least partially encrypted received data without performing a decryption process, and performing an analysis in a state where the at least partially encrypted data is not decrypted.

BRIEF DESCRIPTION OF THE DRAWINGS

The above and other aspects and features of the present invention will become more apparent by describing in detail exemplary embodiments thereof with reference to the attached drawings, in which:

FIG. 5 is a schematic view showing an example of a matching information table;

DETAILED DESCRIPTION OF THE EMBODIMENTS

Figure 1:
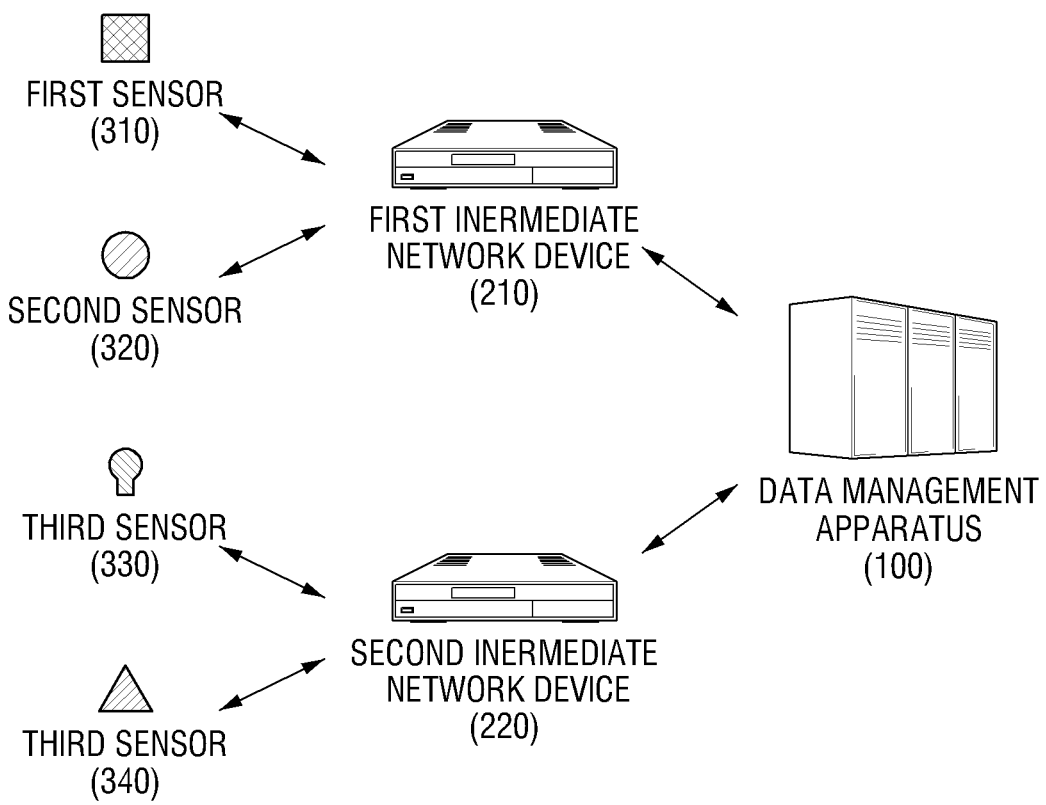
FIG. 1 is a schematic view of a data management system according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The "sensor" used in the description of the present invention means a device capable of collecting information and transmitting the information using wire or wireless communication. The "sensor" includes things used in internet of things (IOTs).

For example, a wearable device, which is worn on the human body to collect information about body temperature, heart rate, and the like, may be included in the sensor of the present invention.

FIG. 1 is a schematic view of a data management system according to an embodiment of the present invention.

Referring to FIG. 1, the data management system according to an embodiment of the present invention includes a plurality of sensors 310, 320, 330, and 340, one or more intermediate network device 210 and 220, and a data management apparatus 100.

The plurality of sensors includes a various types of sensors. Each of the sensors 310, 320, 330, and 340 can collect information and transmit the information. Some of the sensors may have a two-way communication function, and the others of the sensors may have only a one-way communication function.

Each of the sensors 310, 320, 330, and 340 may transmit the collected information to the data management apparatus 100 through an intermediate network device, such as a gate way.

The intermediate network device is provided between the sensor and the data management apparatus 100, and receives the data transmitted from the sensor and transmits this data to the data management apparatus.

The data management apparatus 100 receives data about information collected by the sensor.

Further, the data management apparatus 100 may store the received data.

Moreover, the data management apparatus 100 may perform an analysis for deriving necessary information or providing a service using the stored data.

The data management apparatus 100 will be described in detail with reference to FIG. 2.

Figure 2:
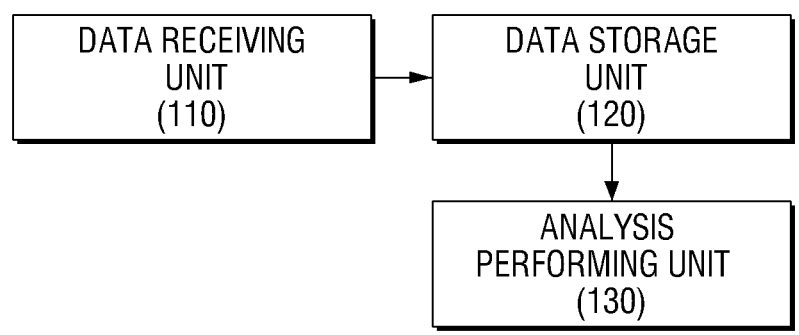
FIG. 2 is a block diagram of a data management apparatus according to an embodiment of the present invention.

FIG. 2 is a block diagram of a data management apparatus according to an embodiment of the present invention.

Referring to FIG. 2, the data management apparatus 100 according to an embodiment of the present invention includes a data receiving unit 110, a data storage unit 120, and an analysis performing unit 130.

The data receiving unit 110 receives data about information collected by the sensor.

The data received by the data receiving unit 110 is at least partially encrypted data.

That is, the data received by the data receiving unit 110 is at least partially encrypted data in the data about information collected by the sensor.

The encryption of at least a part of the data about the information collected by the sensor may be performed in the sensor.

The encryption of at least a part of the data about the information collected by the sensor may also be performed in the intermediate network device receiving this data.

At least partially encrypted data received by the data receiving unit 110 will be described with reference to FIGS. 3 and 4.

Figure 3:
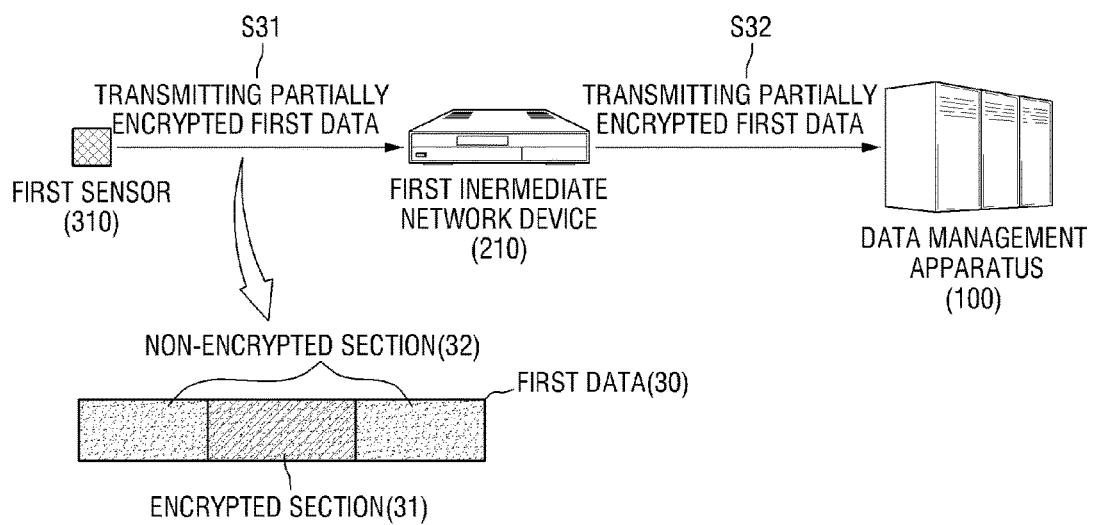
FIG. 3 is a schematic view showing an example of encryption of data in a sensor.

FIG. 3 is a schematic view showing an example of encryption of data in a sensor.

Referring to FIG. 3, the first sensor 310 collects information.

The first sensor 310 encrypts at least a part of first data 30 about the collected information (S31).

The first sensor 310 transmits the at least partially encrypted first data 30 to the data management apparatus 100 through the first intermediate network device 210 (S32).

Figure 4:
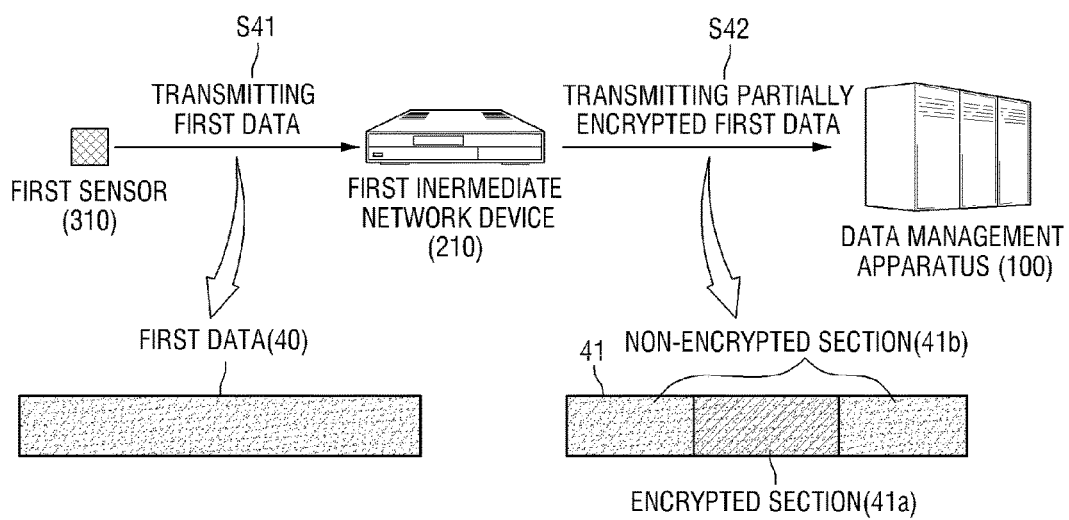
FIG. 4 is a schematic view showing an example of encryption of data in an intermediate network device.

FIG. 4 is a schematic view showing an example of encryption of data in an intermediate network device.

The first sensor 310 collects information.

The first sensor 310 transmits first data about the collected information to the first intermediate network device 210 (S41).

The first intermediate network device 210 encrypts at least a part 41a of the received first data 40.

The first intermediate network device 210 transmits the first data 40, at least a part 41a of which is encrypted, to the data management apparatus 100.

The data receiving unit 110 of the data management apparatus 100 receives the at least partially encrypted first data 41 (including 41a and 41b) in the data about the information collected by the sensor 310.

The sensor and/or the intermediate network device encrypt the selected data according to a predetermined method.

The criteria for selecting a section to be encrypted according to the predetermined method may be set and changed according to the type of information, the type of sensors, data formats, user settings, security level, and the like.

For example, the section to be encrypted according to the predetermined method may be a section having an important content or a section corresponding to information involved in personal information. For example, the predetermined method can encrypt only the data section corresponding to the value measured by the sensor.

Specifically, for example, the data collected and transmitted by a sensor for measuring human body temperature may be set such that only a section corresponding to information about the measured value of the human body temperature is encrypted.

As the encryption method, a known encryption method can be used or applied.

Referring to FIG. 2 again, the data storage unit 120 stores the data received from the data receiving unit 110.

That is, the data storage unit 120 stores at least partially encrypted data.

The data storage unit 120 stores the at least partially encrypted data without being decrypted.

The analysis performing unit 130 can perform an analysis of the received data or the stored data.

The analysis performing unit 130 can derive useful information, such as information necessary for service, by performing the analysis thereof.

Specifically, the analysis performing unit 130 performs the analysis of the stored data in a state where the encrypted section of the data is maintained.

That is, the analysis performing unit 130 performed the analysis without decrypting the encrypted section thereof.

The analysis performing unit 130 can perform the analysis using a matching information table, which is a table including the encrypted data and data matched with this encrypted data, without decrypting the encrypted section thereof.

Subsequently, the analysis performing unit 130 acquires information matched with the encrypted data from the matching information table.

The analysis performing unit 130 can use the acquired information for analysis.

An example, in which the analysis performing unit 130 perform an analysis using the matching information table without decrypting the encrypted section of the data, will be described with reference to FIG. 5.

FIG. 5 is a schematic view showing an example of a matching information table.

Referring to the matching information table 50, in the case where the encrypted section included in the data received by the data management apparatus 100 or the data stored in the data management apparatus 100 is "AK245 (51*a*)", the analysis performing unit 130 can acquires the data, called "normal atmospheric pressure (52*a*)", and can use this acquired data in analysis.

Even in the case where the encrypted section is "BC37A (51*b*)", "TY274 (51*c*)", or "GD4KY6 (51*f*), the analysis performing unit 130 can acquires the data, called "normal atmospheric pressure (52*a*)".

In the case where the encrypted section is "CKD28T (51*d*)" or "JXX2YT (51*e*), the analysis performing unit 130 can acquires the data, called "low humidity (52*b*)".

Continuously, referring to FIG. 5, it can be seen that there is a case of a plurality of different encrypted data being matched with the same information.

There is a case of one encrypted data being matched with the same information, but, basically, the matching information table is set to allow a plurality of different encrypted data to be matched with the same one information.

When a plurality of different encrypted data are matched with the same one information and the analysis performing unit 130 acquires such matching information and perform an analysis using this matching information, the protection of the collected information can be enhanced.

The data management apparatus 100 according to an embodiment of the present invention can perform an analysis without decrypting the encrypted data. Therefore, the data management apparatus 100 does not have a decryption key necessary for decrypting the encrypted data. That is, fundamentally, there is no method for decrypting the encrypted data. Therefore, the accurate meaning of original data cannot be determined even if the data is divulged.

Further, since the matching information table used in analysis is configured such that a plurality of different encrypted data are matched with the same one information, not one-to-one matching information, accurate information cannot be determined from each encrypted data even if the matching information table is divulged.

An example in which the analysis performing unit 130 performs an analysis will be described in more detail with reference to FIG. 5.

The actual data of "CKD28T (51*d*)", which is the encrypted section of first data about the information collected by the first sensor 310, is assumed to be "27%".

Further, the actual data of "JXX2YT (51*e*)" of second data about the information collected by the first sensor 310, is assumed to be "36%".

The non-encrypted section of the first data is assumed to represent the humidity information of building A at time B. Further, the non-encrypted section of the second data is assumed to represent the humidity information of building A at time C.

From these assumptions, the analysis performing unit 130 can acquire the information "humidity of building A at time B is low" from the first data, and can also acquire the information "humidity of building A at time C is low" from the second data.

The analysis performing unit 130 can perform an analysis using the acquired information through the predetermined analysis method. As the predetermined analysis method, commonly known various analysis methods can be used, and can be differently set and changed according to the kind of services to be provided, the information to be derived, the information to be used, or the like.

As the analysis result of the analysis performing unit 130, information for providing the service "humidification system operation for improving the humidity of building A is required", and other various kinds of information can be derived.

Figure 6:
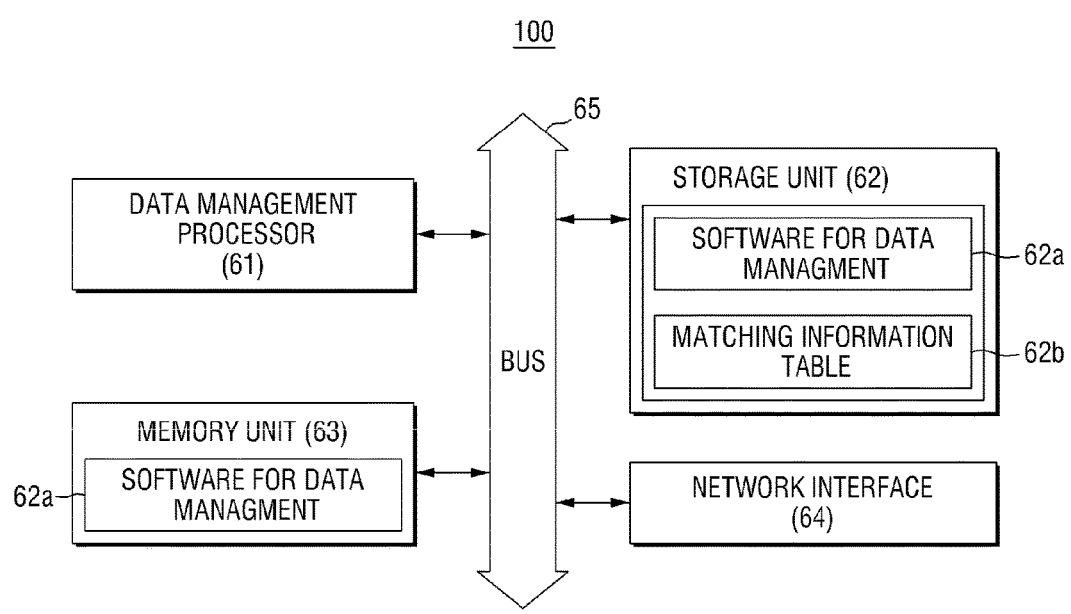
FIG. 6 is block diagram showing an example of a hardware configuration of a data management apparatus according to another embodiment of the present invention.

FIG. 6 is block diagram showing an example of a hardware configuration of a data management apparatus according to another embodiment of the present invention.

The data management apparatus according to this embodiment may have a configuration of FIG. 6.

As shown in FIG. 6, the data management apparatus 100 may include a data management processor 61, a storage unit 62, a memory unit 63, and a network interface 64.

Further the data management apparatus may include a system bus 65 connected with the data management processor 61 and the memory unit 63 to become a data transfer channel.

The network interface may be connected to another computing apparatus. Examples of the computing apparatus may include a display device and a user terminal.

The network interface may be Ethernet, Fire Wire, USB, or the like.

The storage unit 62 may be a non-volatile memory device, a hard disk, or the like, but is not limited thereto.

The storage unit 62 stores the data of a computer program 62*a* for data management. The data of the computer program 62*a* for data management may include a binary executable file and other resource files.

The storage unit 62 may store a matching information table 62*b*.

The memory unit 63 loads the computer program 62*a* for data management.

The computer program 62*a* for data management is provided to the data management processor 61, and is executed by the data management processor 61.

The data management processor 61 is a processor that can execute the computer program 62*a* for data management. However, the data management processor 61 may not be a processor that can execute only the computer program 62*a* for data management. For example, the data management processor 61 can execute other programs in addition to the computer program 62*a* for data management.

The computer program 62*a* for data management may include a series of operations which perform the processes of: receiving at least partially encrypted data in the data about information collected by sensor; and performing an analysis in a state where both the non-encrypted section and encrypted section of the at least partially encrypted data are not decrypted.

Further, the process of performing the analysis may include a series of operations which perform the processes of: acquiring information matched with the encrypted data section using the specific encrypted data and the table information about information matched with the specific encrypted data; and performing an analysis using the matched information.

Hereinafter, a data analysis method according to an embodiment of the present invention will be described with reference to FIGS. 7 and 8. The data analysis method according to this embodiment can be performed by a computing apparatus provided with computing means. For example, the computing apparatus may be a data management apparatus 100 according to an embodiment of the present invention. The configuration and operation of the data management apparatus can be understood through those having been described with reference to FIGS. 1 to 6.

Similarly, the data management apparatus 100 according to this embodiment, having been described with reference to FIGS. 1 to 6, may be applied to the data analysis method according to an embodiment of the present invention.

Figure 7:
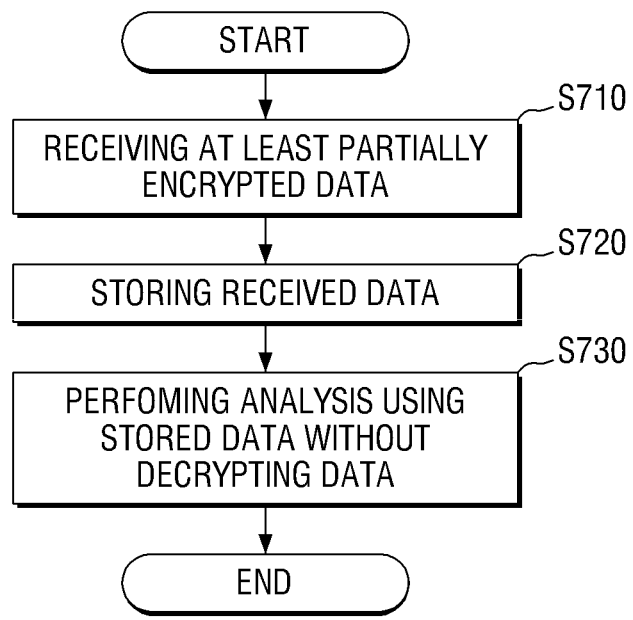
FIG. 7 is a flowchart of a data analysis method according to an embodiment of the present invention.

FIG. 7 is a flowchart of a data analysis method according to an embodiment of the present invention.

Referring to FIG. 7, a computing apparatus receives at least partially encrypted data in the data about information collected by a sensor (S710).

The computing apparatus stores the receive data (S720).

The computing apparatus stores the receive data without decrypting the encrypted section thereof.

The computing apparatus performs an analysis using the stored data according to the predetermined method (S730).

The computing apparatus performs an analysis in the state where both the non-encrypted section and encrypted section of the stored data are not decrypted. The computing apparatus performs an analysis using a matching information table without decrypting the encrypted section of the data.

Figure 8:
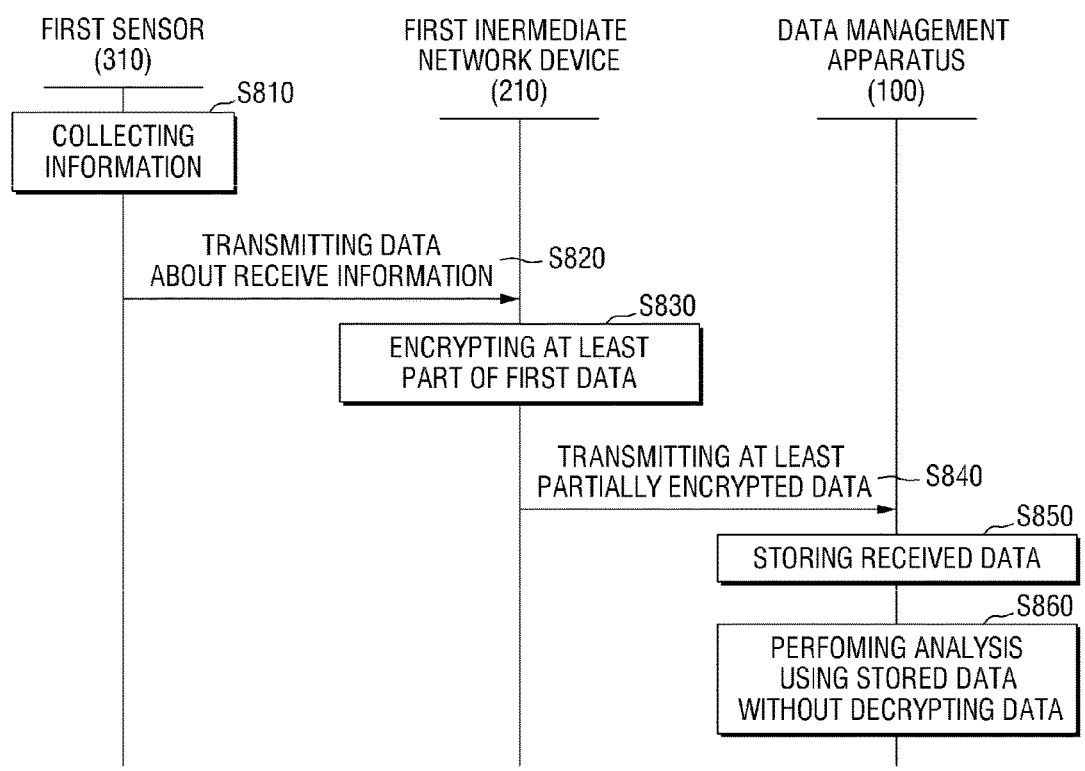
FIG. 8 is an operation flowchart of a data analysis method according to another embodiment of the present invention.

FIG. 8 is an operation flowchart of a data analysis method according to another embodiment of the present invention.

For understanding, the first sensor 310 is selected from sensors, the first intermediate network device 210 is selected from intermediate network devices, and the operation of the first sensor 310 and the operation of the first intermediate network device 210 will be described.

The first sensor 310 collects information and generates data (S810). The first sensor 310 transmits the generated data about the information collected by the first sensor 310 to the first intermediate device 210 (S820).

Another device for wire or wireless communication may be provided between the first sensor 310 and the first intermediate network device 210.

The first intermediate network device 210 encrypts at least a part of the data received from the first sensor 310.

The first intermediate network device 210 selects a section to be encrypted from the data received from the first sensor 310, and encrypts the selected section of the data. For example, the first intermediate device 210 may encrypt the data section representing the measured value of data about the collected information.

The first intermediate network device 210 transmits the at least partially encrypted data about the collected information to the data management apparatus 100 (S840).

Another device for wire or wireless communication may also be provided between the first intermediate network device 210 and the data management apparatus 100.

The data management apparatus 100 receives and stores the data transmitted from the first intermediate network device 210 (S850).

The data management apparatus 100 performs an analysis without decrypting the encrypted section of the stored data (S860).

Since the data management apparatus 100 does not decrypt the encrypted section, the data obtained by decrypting the encrypted section does not exist in the data management apparatus 100.

Referring to FIG. 8, it can be ascertained that the intermediate network device encrypts at least a part of the data about the information collected by the sensor, and transmits the encrypted data to the data management apparatus 100.

Unlike this, as described with reference to FIG. 3, a part of data may be encrypted in the sensor, and the encrypted data may be transmitted to the data management apparatus 100.

Although FIGS. 7 and 8 show operations in a specific order, it should not be understood that desired results can be obtained only when operations are executed in a specific order or in a sequential order. In certain circumstances, multitasking and parallel processing may be advantageous. Moreover, it should not be understood that the separation of various configurations in the above-described embodiments is necessarily required, and it should be understood that the above-described program components and systems can be generally integrated together into a single software product, or can be packaged into multiple software products.

As described above, in the data management apparatus 100, the data management method, and the manage management system using the same according to an embodiment of the present invention, the time and cost taken to encrypt and decrypt data can be reduced, and the security of data can be improved.

Further, in the data management apparatus 100, the data management method, and the manage management system using the same according to an embodiment of the present invention, the encrypted data can be analyzed without being decrypted. Therefore, the time and cost taken to decrypt the encrypted data can be reduced. Moreover, since the data obtained by decrypting the encrypted data does not exist, safety can be maintained even in the leakage of data.

The data management apparatus 100, the data management method, and the manage management system using the same according to an embodiment of the present invention can be effectively applied under environments of internet of things, big data collection, big data analysis, and the like. However, they are not applied only in such environments, and can be applied in all environments, in which data transmission, data storage, and data analysis are performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for managing data, comprising:
   receiving data collected by a sensor, the data comprising an encrypted section and a non-encrypted section, the encrypted section comprising a first encrypted data entry and a second encrypted data entry;
   using a mapping table to map the first encrypted data entry and the second encrypted data entry to a first matched information entry without decrypting the first encrypted data entry and the second encrypted data entry, wherein the first encrypted data entry corresponds to a first decrypted data value that is different from the first matched information entry, and wherein the second encrypted data entry corresponds to a second decrypted data value that is different from the first matched information entry and the first decrypted data value; and based on at least the first matched information entry, performing, via a hardware processor, an analysis of the data without decrypting the encrypted section, wherein the first decrypted data value and the second decrypted data value indicate measured values by a sensor, and wherein the first matched information indicates processed information obtained by processing the measured values according to a predetermined criterion.

2. The method for managing data according to claim 1, wherein the performing the analysis comprises:

acquiring matched information that is matched with the encrypted section of the data by using the mapping table, which includes mapping relationships between the encrypted section and the matched information; and performing the analysis further based on the matched information.

3. The method for managing data according to claim 2, wherein the mapping relationships of the mapping table allow a plurality of different encrypted data entries of the encrypted section to be matched with a same matched information entry of the matched information.

4. The method for managing data according to claim 3, wherein the encrypted section further comprises a third encrypted data entry, wherein the using the mapping table further comprises mapping the third encrypted data entry to a second matched information entry that is different from the first matched information entry, and wherein the third encrypted data entry corresponds to a third decrypted data value that is different from the second matched information entry, the first decrypted data value, and the second decrypted data value.

5. The method for managing data according to claim 1, further comprising:

storing the encrypted section of the data without decrypting the encrypted section.

6. A method for managing data encryption, comprising:

encrypting, by one of a sensor and an intermediate network device connected between the sensor and a data management apparatus, at least a part of data collected by the sensor to yield partially encrypted data comprising an encrypted section and a non-encrypted section, the encrypted section comprising a first encrypted data entry and a second encrypted data entry;

transmitting, by the one of the sensor and the intermediate network device, the partially encrypted data;

receiving, by the data management apparatus, the partially encrypted transmitted data;

storing, by the data management apparatus, the partially encrypted received data;

using a mapping table to map the first encrypted data entry and the second encrypted data entry to a first matched information entry without decrypting the first encrypted data entry and the second encrypted data entry, wherein the first encrypted data entry corresponds to a first decrypted data value that is different from the first matched information entry, and wherein the second encrypted data entry corresponds to a second decrypted data value that is different from the first matched information entry and the first decrypted data value; and based on at least the first matched information entry, performing, by the data management apparatus, an analysis of the partially encrypted data without decrypting the encrypted section, wherein the first decrypted data value and the second decrypted data value indicate measured values by a sensor, and wherein the first matched information indicates processed information obtained by processing the measured values according to a predetermined criterion.

7. The method for managing data encryption according to claim 6, wherein the encrypted section is selected from the data according to a predetermined method.

8. The method for managing data encryption according to claim 6, wherein the encrypted section represents measured values of the data collected by the sensor.

9. A data management apparatus, comprising:

a hardware processor; and a non-transitory computer-readable storage medium storing instructions which, when executed by the hardware processor, cause the hardware processor to perform operations comprising:

receiving data collected by a sensor, the data comprising an encrypted section and a non-encrypted section, the encrypted section comprising a first encrypted data entry and a second encrypted data entry, using a mapping table to map the first encrypted data entry and the second encrypted data entry to a first matched information entry without decrypting the first encrypted data entry and the second encrypted data entry, wherein the first encrypted data entry corresponds to a first decrypted data value that is different from the first matched information entry, and wherein the second encrypted data entry corresponds to a second decrypted data value that is different from the first matched information entry and the first decrypted data value, and based on at least the first matched information entry, performing an analysis of the data without decrypting the encrypted section, wherein the first decrypted data value and the second decrypted data value indicate measured values by a sensor, and wherein the first matched information indicates processed information obtained by processing the measured values according to a predetermined criterion.

10. The data management apparatus according to claim 9, wherein the data management apparatus does not have a decryption key for decrypting the encrypted section of the data.

11. The data management apparatus according to claim 9, wherein the non-transitory computer-readable storage medium stores additional instructions which, when executed by the hardware processor, cause the hardware processor to perform further operations comprising acquiring matched information that is matched with the encrypted section of the data by using the mapping table, which includes mapping relationships between the encrypted section and the matched information, and perform the analysis further based on the matched information.

12. The data management apparatus according to claim 11, wherein the mapping relationships of the mapping table allow a plurality of different encrypted data entries of the encrypted section to be matched with a same matched information entry of the matched information.

* * * * *